US012198595B2

(12) United States Patent
Lu et al.

(10) Patent No.: US 12,198,595 B2
(45) Date of Patent: Jan. 14, 2025

(54) DRIVING METHOD FOR DISPLAY AND DISPLAY

(71) Applicants: Huizhou China Star Optoelectronics Display Co., Ltd., Huizhou (CN); Shenzhen China Star Optoelectronics Semiconductor Display Technology Co., Ltd., Shenzhen (CN)

(72) Inventors: Xiaobing Lu, Huizhou (CN); Xiaolong Chen, Huizhou (CN)

(73) Assignees: Huizhou China Star Optoelectronics Display Co., Ltd., Huizhou (CN); Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/768,540

(22) PCT Filed: Dec. 16, 2021

(86) PCT No.: PCT/CN2021/138669
§ 371 (c)(1),
(2) Date: Apr. 13, 2022

(87) PCT Pub. No.: WO2023/102996
PCT Pub. Date: Jun. 15, 2023

(65) Prior Publication Data

US 2024/0119882 A1 Apr. 11, 2024

(30) Foreign Application Priority Data

Dec. 7, 2021 (CN) ......................... 202111485219.1

(51) Int. Cl.
*G09G 3/20* (2006.01)

(52) U.S. Cl.
CPC ... *G09G 3/2007* (2013.01); *G09G 2320/0276* (2013.01); *G09G 2330/021* (2013.01)

(58) Field of Classification Search
None
See application file for complete search history.

(56) References Cited

U.S. PATENT DOCUMENTS 10,417,995 B2 9/2019 Xu et al.
11,151,941 B1 10/2021 Shikata et al.
(Continued)

FOREIGN PATENT DOCUMENTS

CN 101075415 11/2007
CN 101615382 12/2009
(Continued)

OTHER PUBLICATIONS

International Search Report and the Written Opinion Dated Aug. 25, 2022 From the International Searching Authority Re. Application No. PCT/CN2022/072941 and Its Translation Into English. (17 Pages).
(Continued)

*Primary Examiner* — Matthew Yeung

(57) ABSTRACT

A driving method for a display and a display are provided. The driving method includes: obtaining a first gray scale extremum of a target image frame according to display data of the target image frame; adjusting a first power voltage according to the first gray scale extremum, to obtain a second power voltage; and driving, according to the second power voltage and the display data of the target image frame, the display for displaying. By means of the present disclosure, the second power voltage can be dynamically adjusted, thereby ensuring the display effect and reducing the energy consumption of the display panel.

12 Claims, 4 Drawing Sheets

(56) References Cited

U.S. PATENT DOCUMENTS

| | | | | |
|---|---|---|---|---|
| 11,244,590 | B2 * | 2/2022 | Kim | G09G 3/2003 |
| 2013/0127923 | A1 | 5/2013 | An et al. | |
| 2015/0243211 | A1 * | 8/2015 | Pyo | G09G 3/20 345/212 |
| 2016/0042687 | A1 | 2/2016 | Jeong et al. | |
| 2021/0193047 | A1 * | 6/2021 | Kwon | G09G 3/3258 |
| 2021/0319740 | A1 | 10/2021 | Pyun et al. | |

FOREIGN PATENT DOCUMENTS

| | | |
|---|---|---|
| CN | 101873064 | 10/2010 |
| CN | 102024440 | 4/2011 |
| CN | 102737577 | 10/2012 |
| CN | 102750927 | 10/2012 |
| CN | 102956173 | 3/2013 |
| CN | 103165066 | 6/2013 |
| CN | 103680401 | 3/2014 |
| CN | 103680431 | 3/2014 |
| CN | 103956143 | 7/2014 |
| CN | 104200785 | 12/2014 |
| CN | 104240661 | 12/2014 |
| CN | 105118437 | 12/2015 |
| CN | 105262964 | 1/2016 |
| CN | 105528994 | 4/2016 |
| CN | 105895044 | 8/2016 |
| CN | 106324875 | 1/2017 |
| CN | 106847198 | 6/2017 |
| CN | 106847217 | 6/2017 |
| CN | 107065252 | 8/2017 |
| CN | 107068098 | 8/2017 |
| CN | 107316608 | 11/2017 |
| CN | 108665844 | 10/2018 |
| CN | 108932936 | 12/2018 |
| CN | 108986762 | 12/2018 |
| CN | 109308883 | 2/2019 |
| CN | 109859670 | 6/2019 |
| CN | 109872701 | 6/2019 |
| CN | 110111731 | 8/2019 |
| CN | 111415616 | 7/2020 |
| CN | 111968567 | 11/2020 |
| CN | 112289254 | 1/2021 |
| CN | 112382247 | 2/2021 |
| CN | 213025334 | 4/2021 |
| CN | 114360427 | 4/2022 |
| CN | 114360428 | 4/2022 |
| CN | 114787904 | 7/2022 |
| EP | 3392870 | 10/2018 |
| JP | 06-332409 | 12/1994 |
| JP | 09-81081 | 3/1997 |
| JP | 2011-077932 | 4/2011 |
| KR | 10-2012-0074915 | 7/2012 |

OTHER PUBLICATIONS

International Search Report and the Written Opinion Dated Aug. 25, 2022 From the International Searching Authority Re. Application No. PCT/CN2022/073006 and Its Translation Into English. (17 Pages).

International Search Report and the Written Opinion Dated Aug. 29, 2022 From the International Searching Authority Re. Application No. PCT/CN2022/138669 and Its Translation Into English. (20 Pages).

International Search Report and the Written Opinion Dated Aug. 31, 2022 From the International Searching Authority Re. Application No. PCT/CN2022/073599 and Its Translation Into English. (17 Pages).

Notification of Office Action and Search Report Dated Sep. 26, 2022 From The State Intellectual Property Office of the People's Republic of China Re. Application No. 202210027913.7 and Its Translation Into English. (15 Pages).

Notification of Office Action and Search Report Dated Apr. 27, 2023 From The State Intellectual Property Office of the People's Republic of China Re. Application No. 202210027913.7 and Its Translation Into English. (18 Pages).

Notification of Office Action and Search Report Dated Apr. 28, 2023 From The State Intellectual Property Office of the People's Republic of China Re. Application No. 202210027929.8 and Its Translation Into English. (26 Pages).

Notification of Office Action and Search Report Dated Apr. 28, 2023 From The State Intellectual Property Office of the People's Republic of China Re. Application No. 202210027960.1 and Its Translation Into English. (27 Pages).

Notification of Office Action and Search Report Dated Jun. 28, 2024 From The State Intellectual Property Office of the People's Republic of China Re. Application No. 202180006041.X and Its Translation Into English. (17 Pages).

* cited by examiner

DRIVING METHOD FOR DISPLAY AND DISPLAY

RELATED APPLICATIONS

This application is a National Phase of PCT Patent Application No. PCT/CN2021/138669 having International filing date of Dec. 16, 2021, which claims the benefit of priority of Chinese Patent Application No. 202111485219.1 filed on Dec. 7, 2021. The contents of the above applications are all incorporated by reference as if fully set forth herein in their entirety.

FIELD AND BACKGROUND OF THE INVENTION

The present disclosure relates to the field of display technologies, and in particular, to a driving method for a display and a display.

The display panel having the large size, the high refresh rate, and the high resolution generally has excessive power consumption. Therefore, how to reduce the power consumption of the display panel having the large size, the high refresh rate, and the high resolution is a problem worth studying. Especially in the current environment of controlling environmental pollution and improving the environmental performance of energy-consuming products, the problem is required to be resolved.

However, the solutions of the related art cause excessive power consumption in practical application. How to reduce the power consumption of the display panel while ensuring the quality of the display is a problem worth studying.

SUMMARY OF THE INVENTION

The present disclosure is mainly intended to address the technical problem of how to reduce the power consumption of the display panel while ensuring the quality of the display picture.

In view of this, the present disclosure provides a driving method for a display and a display, so as to dynamically and adaptively adjust the second power voltage, thereby further reducing the energy consumption of the display panel while ensuring the display effect of the display panel.

According to an aspect of the present disclosure, a driving method for a display is provided. The driving method for a display includes: obtaining a first gray scale extremum of a target image frame according to display data of the target image frame; adjusting a first power voltage according to the first gray scale extremum, to obtain a second power voltage, wherein the first power voltage is used for driving the display for displaying; and driving, according to the second power voltage and the display data of the target image frame, the display for displaying.

According to another aspect of the present disclosure, a display is provided. The display includes a first acquisition module electrically connected to a second acquisition module and configured to obtain a first gray scale extremum of the target image frame according to display data of the target image frame; the second acquisition module electrically connected to the first acquisition module and a display module and configured to adjust a first power voltage according to the first gray scale extremum, to obtain a second power voltage, wherein the first power voltage is used for driving the display for displaying; and the display module electrically connected to the second acquisition module and configured to drive, according to the second power voltage and the display data of the target image frame, the display for displaying.

Based on the above, the first gray scale extremum of the target image frame is obtained according to the display data of the target image frame. Then the first power voltage is adjusted according to the first gray scale extremum, to obtain the second power voltage. Finally, the display is driven, according to the second power voltage and the display data of the target image frame, for displaying. According to various aspects of the present disclosure, the second power voltage can be dynamically and adaptively adjusted, thereby further reducing the energy consumption of the display panel while ensuring the display effect of the display panel.

BRIEF DESCRIPTION OF THE SEVERAL VIEWS OF THE DRAWINGS

The following describes specific implementations of the present disclosure in detail with reference to the accompanying drawings, to make the technical solutions and other beneficial effects of the present disclosure obvious.

DESCRIPTION OF SPECIFIC EMBODIMENTS OF THE INVENTION

Figure 1:
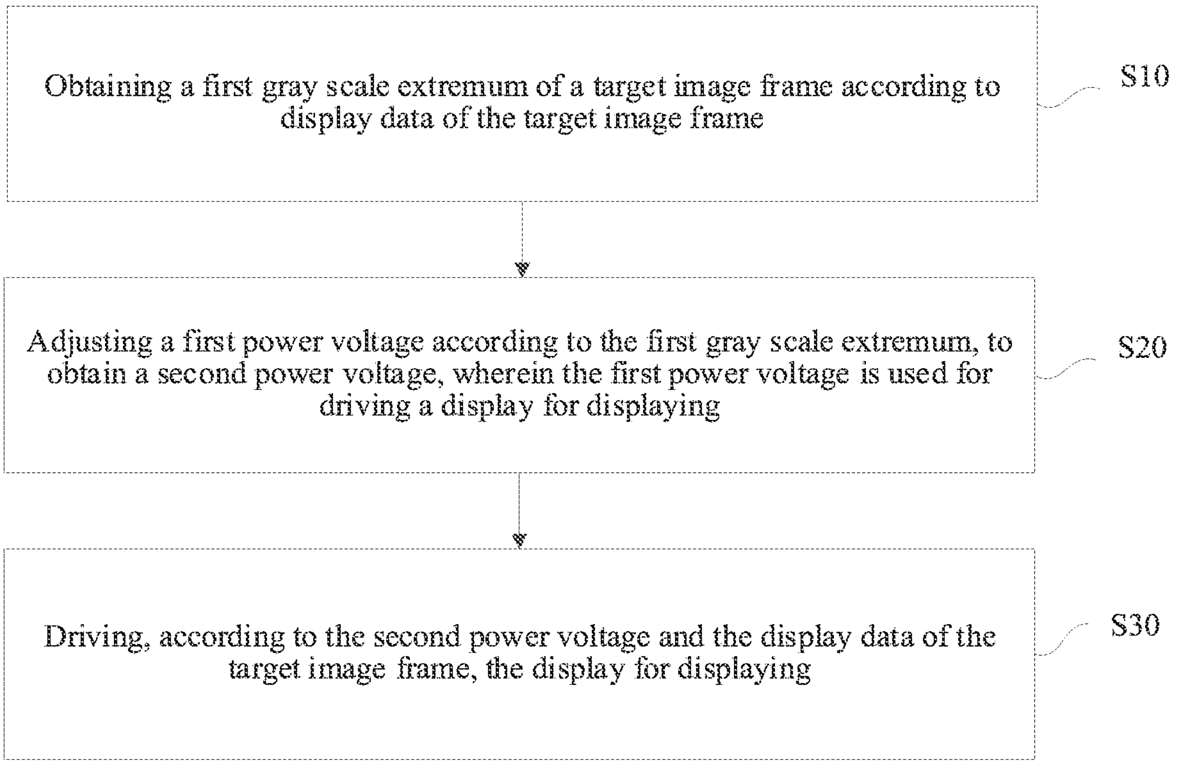
FIG. 1 is a flowchart of a driving method for a display according to an embodiment of the present disclosure.

The following clearly and completely describes technical solutions in embodiments of the present disclosure with reference to the accompanying drawings in the embodiments of the present disclosure. Apparently, the described embodiments are only some embodiments rather than all of the embodiments of the present disclosure. All other embodiments obtained by a person skilled in the art based on the embodiments of the present disclosure without creative efforts shall fall within the protection scope of the present disclosure.

In the description of the present disclosure, it should be understood that orientation or position relationships indicated by the terms such as “center”, “longitudinal”, “transverse”, “length”, “width”, “thickness”, “above”, “below”, “front”, “rear”, “left”, “right”, “vertical”, “horizontal”, “top”, “bottom”, “inside”, “outside”, “clockwise”, “anti-clockwise” are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as a limitation to the present disclosure. In addition, the terms “first” and “second” are used only used for the purpose of description and are not to be construed as indicating or implying relative importance or implicitly indicating a quantity of technical features indicated. Therefore, features defined by “first” and "second" may explicitly or implicitly include one or more of the features. In the descriptions of the present disclosure, "a plurality of" means two or more, unless otherwise definitely and specifically defined.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; a mechanical connection, an electrical connection, or mutual communication; a direct connection, an indirect connection through an intermediate, or internal communication between two elements or an interaction relationship between two elements. A person of ordinary skill in the art may understand the specific meanings of the foregoing terms in the present disclosure according to specific situations.

Many different implementations or examples are provided below to implement different structures of the present disclosure. To simplify the disclosure of the present disclosure, the following describes components and settings of particular examples. Certainly, the components and settings are merely examples, and are not intended to limit the present disclosure. In addition, in the present disclosure, reference numbers and/or reference letters may be repeated in different examples. Such repetition is intended to simplify and clarify the present disclosure, and does not indicate a relationship between various implementations and/or settings that are discussed. In addition, the present disclosure provides examples of various specific processes and materials, but a person skilled in the art may be aware of the applicability of other processes and/or the use of other materials. In some embodiments, methods, means, components, and circuits well known by a person skilled in the art are not described in detail, to highlight the main idea of the present disclosure.

The present disclosure provides a driving method for a display. The driving method for a display includes: obtaining a first gray scale extremum of a target image frame according to display data of the target image frame; adjusting a first power voltage according to the first gray scale extremum, to obtain a second power voltage, wherein the first power voltage is used for driving the display for displaying; and driving, according to the second power voltage and the display data of the target image frame, the display for displaying.

Based on the above, the first gray scale extremum of the target image frame is obtained according to the display data of the target image frame. Then the first power voltage is adjusted according to the first gray scale extremum, to obtain the second power voltage. Finally, the display is driven, according to the second power voltage and the display data of the target image frame, for displaying. By means of the present disclosure, the second power voltage can be dynamically and adaptively adjusted, thereby further reducing the energy consumption of the display panel while ensuring the display effect of the display panel.

FIG. 1 is a flowchart of a driving method for a display according to an embodiment of the present disclosure.

As shown in FIG. 1, the display includes a driving module and a display panel. The driving module is electrically connected to the display panel, and display data of a target image frame is prestored in the driving module. The driving method for a display includes steps as follows.

Step S10: Obtaining a first gray scale extremum of the target image frame according to the display data of the target image frame.

The display data of the target image frame is prestored in the driving module. For example, a memory may be disposed in the driving module for prestoring the display data of the target image frame. Certainly, a display picture of the display panel may include a plurality of frames. Display data of all frames of the display panel may also be prestored in the driving module.

Further, the target image frame of the display panel includes a plurality of pixel points, wherein a gray scale corresponding to at least one of the pixel points is preset for the pixel point. The display data of the target image frame can be represented by a one-dimensional array or a multi-dimensional array. Each element in the array may correspond to each of the pixel points of the display picture, and is used for driving each pixel in the display panel for displaying according to a preset gray scale. It may be understood that how the display data is represented is not limited in the present disclosure.

Further, the obtaining a first gray scale extremum of the target image frame according to the display data of the target image frame includes steps as follows.

Step S101: Obtaining a first gray scale range of the target image frame according to the display data of the target image frame.

Step S102: Obtaining the first gray scale extremum of the target image frame according to the first gray scale range.

Further, the first gray scale extremum of the target image frame may be a largest one of a plurality of first gray scales of the target image frame. The first gray scale may be a preset gray scale. The display data of the target image frame may include the plurality of first gray scales, and each of the first gray scales corresponds to one pixel point of the target image frame. For example, the gray scale of the display data of all frames of the display panel may be represented by 8-bit binary numbers ranging from 0 to 255. For a display picture frame, the display picture frame may include 1024*768 pixels. A first gray scale range of the pixels of the display picture frame may be from 16 to 128. That is to say, for the display picture frame, the first gray scale extremum of the display picture frame may be 128, that is, the largest one of the gray scales of the display picture frame.

Further, the target image frame may be divided into a plurality of display areas. The first gray scale extremum is a largest one of the plurality of first gray scales of at least one of the plurality of display areas, and the second gray scale extremum is a largest one of the plurality of second gray scales of at least one of the plurality of display areas. The largest one of the gray scales of each display area may be different. Therefore, the first gray scale extremum of the target image frame may alternatively be the largest one of the plurality of first gray scales in a display area of the image frame. For example, the target image frame may be divided into two display areas. The first gray scale range of the first display area is from 16 to 108, and the first gray scale range of the second display area is from 32 to 116. At this point, the first gray scale extremum of the target image frame may be the largest one (that is, 108) of the gray scales of the first display area, or may be the largest one (that is, 116) of the gray scales of the second display area.

It should be noted that a first gray scale may also be arbitrarily selected from the first gray scale range of the target image frame for processing, as long as the selected first gray scale is conducive to reducing the energy consumption of the display panel using the embodiment of the present disclosure. In the embodiment of the present disclosure, the first gray scale extremum of the target image frame is used as a preferred solution, and how to select the first gray scale extremum of the target image frame is not limited in the present disclosure.

Further, the adjusting a first power voltage according to the first gray scale extremum, to obtain a second power voltage further includes the step below.

Step S11: Transforming the plurality of first gray scales of the target image frame to obtain a second gray scale extremum of the target image frame.

Further, since the target image frame may include a plurality of first gray scales, and each of the pixel points in the target image frame may correspond to one of the first gray scales, each of the first gray scales can be transformed to obtain a plurality of transformed second gray scales. Certainly, during the transformation of the first gray scales of the target image frame, the plurality of first gray scales of the target image frame may alternatively be divided into a plurality of sub-intervals, and the transformation is performed by sections according to the plurality of sub-intervals. In another example, during the transformation of the first gray scales of the target image frame, only the first gray scales corresponding to some pixel points in the target image frame may be transformed, while the first gray scales corresponding to other pixel points in the target image frame are not transformed. It may be understood that how to transform the plurality of first gray scales of the target image frame is not limited in the present disclosure.

It should be noted that the driving module transforms the plurality of first gray scales of the target image frame based on nonlinear characteristics between visual perception and brightness, to obtain the plurality of transformed second gray scales. The visual perception can be represented by brightness values at which observation can be performed by human eyes, and the brightness can be represented by a brightness factor. Therefore, based on the nonlinear relationship between the visual perception of the image and the brightness, statistical analysis can be performed on the pixel points of the target image frame, to obtain a range of the brightness values of the target image frame. Certainly, statistical analysis may also be performed on the gray scales of the target image frame, to obtain a range of the gray scales.

Further, the transforming a plurality of first gray scales of the target image frame to obtain a second gray scale extremum of the target image frame includes steps as follows.

Step S111: The driving module transforms the plurality of first gray scales of the target image frame to obtain a plurality of transformed second gray scales.

Step S112: The driving module obtains the second gray scale extremum of the target image frame according to the plurality of transformed second gray scales.

Each of the plurality of second gray scales after the transformation may correspond to one of the first gray scales before the transformation, or may correspond to the plurality of first gray scales before the transformation. It may be understood that different transformation methods may generate different correspondences between the first gray scales and the second gray scales. The correspondences between the first gray scales and the second gray scales are not limited in the present disclosure.

Further, the second gray scale extremum is a largest one of the plurality of second gray scales of the target image frame. That is to say, the second gray scale extremum and the first gray scale extremum have similar meanings. For example, for a display picture frame, the display picture frame may include 1024*768 pixels. A first gray scale range of the pixels of the display picture frame may be from 16 to 128. That is to say, for the display picture frame, the first gray scale extremum of the display picture frame may be 128. After the plurality of first gray scales of the target image frame are transformed, the second gray scale range of the pixels of the display picture frame may be from 32 to 216. The first gray scale extremum of the display picture frame may be 216.

Further, the transforming the plurality of first gray scales of the target image frame to obtain a plurality of transformed second gray scales includes steps as follows.

Step S1111: The driving module divides a first gray scale range of the target image frame into a plurality of sub-intervals.

Step S1112: The driving module transforms the plurality of first gray scales of the target image frame according to the plurality of divided sub-intervals and a preset transformation coefficient, to obtain the plurality of transformed second gray scales.

For example, step S2012 can be expressed using the formula (1) as follows:

$$Dout(n) = \begin{cases} \lambda_1 \times Din_n & C_0 < Din_n < C_1 \\ \lambda_2 \times Din_n & C_1 < Din_n < C_2 \\ & \dots \\ \lambda_m \times Din_n & C_{m-1} < Din_n < C_m \end{cases}$$

wherein $Din_n$ may represent the first gray scale before an $n^{th}$ pixel point in the inputted target image frame is transformed, $\lambda_1$ may represent the coefficient corresponding to $Din_n$ when the first gray scale of the $n^{th}$ pixel point in the inputted target image frame is in the range of $C_0$ to $C_1$, and $\lambda_2$ may represent the coefficient corresponding to $Din_n$ when the gray scale of the $n^{th}$ pixel in the target image frame is in the range of $C_1$ to $C_2$. By analogy, $\lambda_m$ may represent the coefficient corresponding to $Din_n$ when the gray scale of the $n^{th}$ pixel point in the target image frame is in the range of $C_{m-1}$ to $C_m$. Dout(n) may represent the second gray scale after the transformation of the $n^{th}$ pixel point in the target image frame. m may be used for representing a quantity of the sub-intervals. In an example, $C_0$ may be 0, and $C_m$ may be 255.

Further, the first gray scale range of the target image frame is divided into a plurality of sub-intervals. For example, for a display picture frame, the display picture frame may include 1024*768 pixels. A first gray scale range of the pixels of the display picture frame may be from 16 to 128. At this point, $C_0$ may be 16, $C_1$ may be 32, and $C_m$ may be 126. It may be understood that how to divide the plurality of sub-intervals and the quantity of sub-intervals are not limited in the present disclosure.

Further, for the first gray scale corresponding to at least one pixel point of the target image frame, the first gray scale may be transformed according to the formula (1). For example, a transformation coefficient may be assigned to the first gray scale, and the transformation coefficient is multiplied by the first gray scale to obtain a second gray scale corresponding to the first gray scale. The transformation coefficient may be prestored in the memory. It may be understood that how to determine the transformation coefficient is not limited in the present disclosure.

The first gray scale range of the target image frame is divided into a plurality of sub-intervals, and the plurality of first gray scales of the target image frame are transformed according to the plurality of divided sub-intervals and preset transformation coefficients, to obtain a plurality of transformed second gray scales. By means of the embodiments of the present disclosure, the gray scales of the target image frame can be flexibly transformed, so as to dynamically and adaptively adjust the first power voltage in different application scenarios, thereby achieving an optimal adjustment of the first power voltage, and further saving the power consumption.

Step S20: Adjusting a first power voltage according to the first gray scale extremum, to obtain a second power voltage, wherein the first power voltage is used for driving the display for displaying.

In detail, the adjusting a first power voltage according to the first gray scale extremum, to obtain a second power voltage includes steps below.

Step S201: Determining a first gamma voltage corresponding to the first gray scale extremum according to the first gray scale extremum.

Step S202: Determining a gamma reference voltage according to the first gamma voltage.

Step S203: Adjusting the first power voltage according to the gamma reference voltage, to obtain the second power voltage.

For example, during the determining of the gamma reference voltage according to the first gamma voltage, the gamma reference voltage corresponding to the first gamma voltage may be determined first, and then a new gamma reference voltage is determined again. Since the first gamma voltage of each level is associated with the gamma reference voltage, after the new gamma reference voltage is re-determined, the first gamma voltages of other levels will be adjusted synchronously as a whole.

Figure 2:
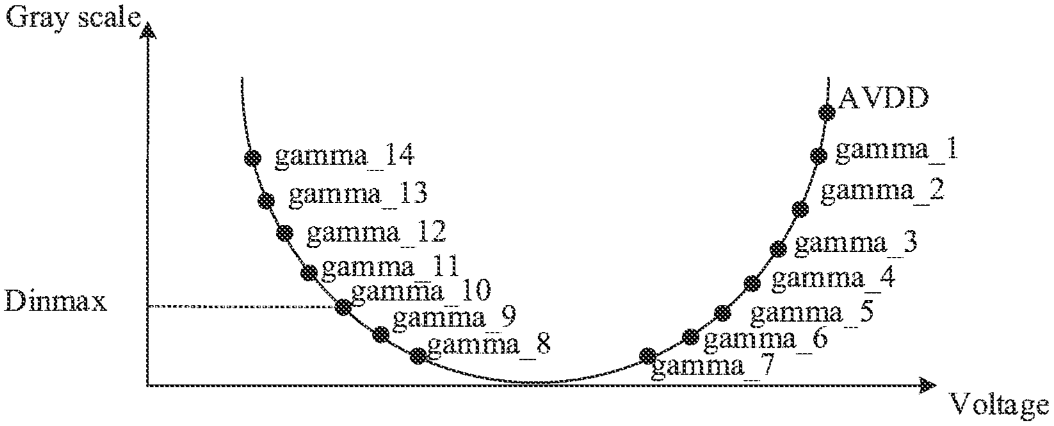
FIG. 2 is a schematic diagram before gray scale transformation according to an embodiment of the present disclosure.
Figure 3:
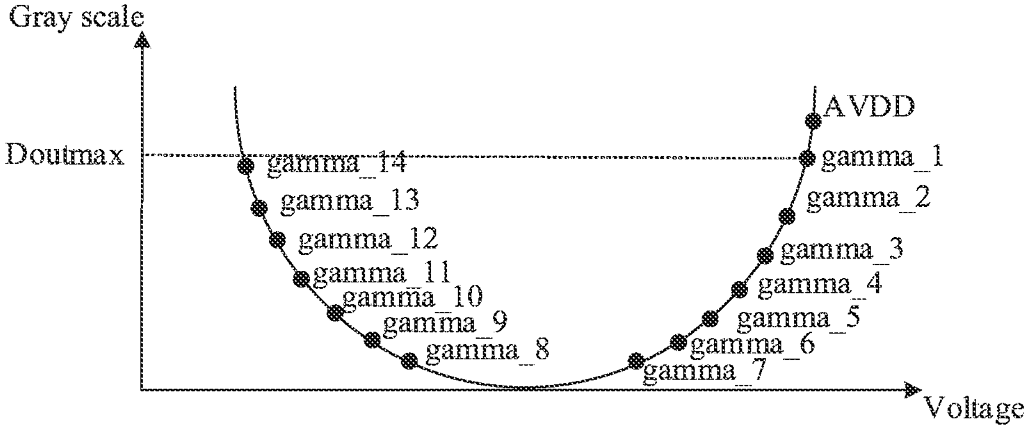
FIG. 3 is a schematic diagram after gray scale transformation according to an embodiment of the present disclosure.

FIG. 2 is a schematic diagram before gray scale transformation according to an embodiment of the present disclosure. FIG. 3 is a schematic diagram after gray scale transformation according to an embodiment of the present disclosure.

As shown in FIGS. 2 and 3, the horizontal axis can represent the voltage, and the vertical axis can represent the gray scale. In FIG. 2, before the transformation of the first gray scale, it can be seen that the largest one of the first gray scales of the target image frame may correspond to a $10^{th}$ level gamma voltage. In FIG. 3, after the transformation of the first gray scale, it can be seen that the largest one of the second gray scales of the target image frame may correspond to a $1^{st}$ level gamma voltage. That is to say, after the transformation, the largest one of the gray scales of the target image frame may be greater than the largest one of the gray scales before the transformation.

In the embodiment of the present disclosure, the gray scale of the target image frame can be adapted to the first power voltage using the segmented function in formula (1) for transformation, so as to ensure the quality of the displayed picture after the first power voltage is adjusted.

The first gray scale extremum may be a first gray scale extremum of the plurality of first gray scales of the target image frame before the transformation, and the second gray scale extremum may be a second gray scale extremum of the plurality of second gray scales of the target image frame before the transformation. The first gray scale extremum and the second gray scale extremum may be different. In the embodiment of the present disclosure, the preset first power voltage is adjusted using a difference between the first gray scale extremum before the transformation and the second gray scale extremum after the transformation. In this way, the minimum first power voltage required to ensure the optimal display can be found, and the minimum first power voltage can be used as the second power voltage, thereby further reducing the energy consumption of the display panel while ensuring the display effect of the display panel.

Further, the adjusting a first power voltage according to the first gray scale extremum, to obtain a second power voltage includes steps as follows.

Step S21: Adjusting the first power voltage according to the first gray scale extremum and the second gray scale extremum, to obtain the second power voltage.

In detail, the adjusting the first power voltage according to the first gray scale extremum and the second gray scale extremum, to obtain the second power voltage includes steps below.

Step S211: Determining a first gamma voltage corresponding to the first gray scale extremum according to the first gray scale extremum, and determining a second gamma voltage corresponding to the second gray scale extremum according to the second gray scale extremum.

Step S212: Determining a gamma reference voltage according to the second gamma voltage.

Step S213: Adjusting the preset first power voltage according to the gamma reference voltage and the first gamma voltage, to obtain the second power voltage.

In an example, 14 levels of gamma voltages are prestored in the driving module, and each level of gamma voltage may correspond to one gray scale. For example, the gamma voltage corresponding to the gray scale of 0 may be a $1^{st}$ level of gamma voltage, that is, gamma_1. The gamma voltage corresponding to the gray scale being 228 may be a $14^{th}$ level of gamma voltage, that is, gamma_14. In addition, the $14^{th}$ level of gamma voltage may correspond to one first power voltage (that is, an AVDD voltage). It should be noted that a plurality of sets of gamma voltages may be set in the driving module, and each set of gamma voltages may include 14 levels of gamma voltages. It may be understood that the correspondences between the gray scale, the gamma voltage, and the first power voltage are not limited in the present disclosure.

Further, the determining the first gamma voltage corresponding to the first gray scale extremum according to the first gray scale extremum may be expressed using the formula (2) as follows:

$$gamma\_num=f1(Din_{max})$$

wherein $Din_{max}$ may represent the first gray scale extremum of the inputted target image frame, gamma_num represents the gamma voltage corresponding to the first gray scale extremum of the target image frame (that is, the first gamma voltage), and num may represent the number of levels of the gamma voltage, for example, gamma_num may be gamma_1 or gamma_3.

Similarly, $Dout_{max}$ may represent the second gray scale extremum of the transformed target image frame. $Dout_{max}$ is used as an input using the formula (2), so that the second gamma voltage gamma_num' corresponding to the second gray scale extremum can be obtained.

Further, the preset first power voltage may be represented by a series of binary numbers, for example, 1010 may indicate that the first power voltage is 10 V. The preset first power voltage may be prestored in the memory. It may be understood that how the power voltage is expressed is not limited in the present disclosure.

Further, the gamma reference voltage may be used for determining the second power voltage, and may be determined according to the second gamma voltage, which may be expressed using the formula (3) as follows:

$$gamma\_ref=f2(gamma\_num')$$

wherein gamma_ref represents the gamma reference voltage, and gamma_num' represents the second gamma voltage corresponding to the second gray scale extremum of the target image frame.

Further, the preset first power voltage is adjusted according to the gamma reference voltage and the first gamma voltage, to obtain the second power voltage, which may be expressed using the formula (4) as follows:

$$AVDD'=f3(gamma\_num,gamma\_ref)$$

wherein AVDD' represents the second power voltage obtained after the preset first power voltage is adjusted.

It should be noted that, in the embodiment of the present disclosure, the functions f1, f2, and f3 may be same or different. It may be understood that in actual application, corresponding functions may be configured according to actual requirements, and the functions f1, f2, and f3 are not limited in the present disclosure.

Step S30: Driving, according to the second power voltage and the display data of the target image frame, the display for displaying.

It should be noted that, the driving module may alternatively drive, according to the second power voltage and the display data of the target image frame corresponding to the second gray scale, the display panel for displaying. That is to say, the display data of the target image frame may include the first gray scale or the transformed second gray scale. In addition, the driving module may alternatively determine a gamma reference voltage according to the first gamma voltage. The driving module adjusts the preset first power voltage according to the gamma reference voltage and the second gamma voltage, to obtain the second power voltage.

Further, the driving method for a display further includes the step below.

Step S40: Adjusting a driving power of the display panel according to the second power voltage.

For example, the adjusting a driving power of the display panel according to the second power voltage may be expressed using the formula (5) as follows:

$$Power=AVDD'*I$$

wherein Power may represent the power of the display panel of the embodiment of the present disclosure, and I may represent the current corresponding to AVDD'. Since AVDD' in the driving method of the present disclosure can be minimized while ensuring the display quality, the energy consumption of the display panel can be further reduced while ensuring the display effect of the display panel.

Figure 4:
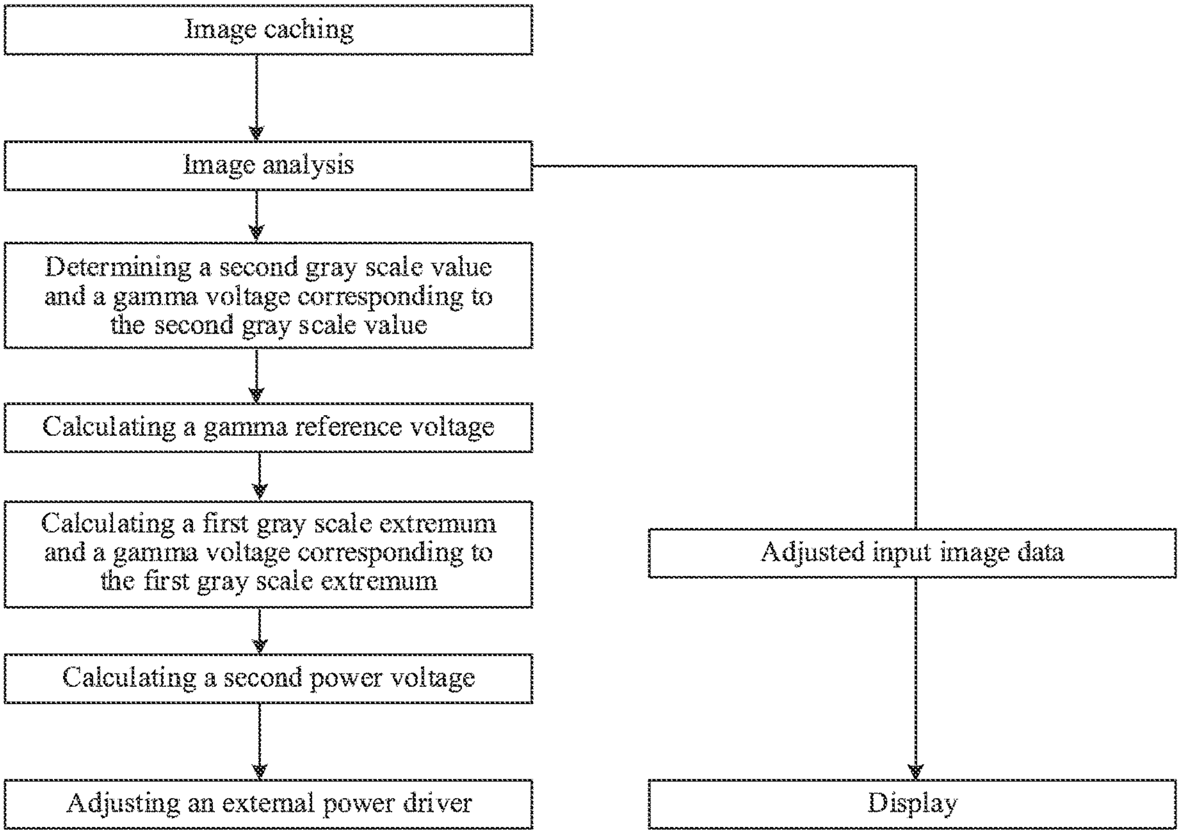
FIG. 4 is a schematic diagram of a driving method for a display according to an embodiment of the present disclosure.

FIG. 4 is a schematic diagram of a driving method for a display according to an embodiment of the present disclosure.

As shown in FIG. 4, in the embodiment of the present disclosure, for example, the inputted image data may be cached first, then image analysis is performed to obtain the first gray scale range of the target image frame and the first gray scale extremum of the target image frame, and the inputted display data is adjusted according to the first gray scale range of the target image frame, to obtain the adjusted inputted image data and a plurality of second gray scales. Then, the second gray scale extremum and the second gamma voltage corresponding to the second gray scale extremum can be obtained from the plurality of second gray scales, and the gamma reference voltage can be calculated. In addition, the first gray scale extremum and the first gamma voltage corresponding to the first gray scale extremum may also be calculated. Finally, the adjusted AVDD value (that is, the second power voltage) is calculated, and an external power driver is adjusted according to the second power voltage, and finally, together with the adjusted inputted image data, the display panel is driven to display the picture. It may be understood that the sequence in FIG. 4 does not limit the implementation steps of the embodiment of the present disclosure.

The present disclosure further provides a display. The display includes a first acquisition module electrically connected to a second acquisition module and configured to obtain a first gray scale extremum of the target image frame according to display data of the target image frame; the second acquisition module electrically connected to the first acquisition module and a display module and configured to adjust a first power voltage according to the first gray scale extremum, to obtain a second power voltage, wherein the first power voltage is used for driving the display for displaying; and the display module electrically connected to the second acquisition module and configured to drive, according to the second power voltage and the display data of the target image frame, the display for displaying.

Further, the first acquisition module includes: a first gray scale range acquisition module configured to obtain a first gray scale range of the target image frame according to the display data of the target image frame; and a first gray scale extremum acquisition module configured to obtain the first gray scale extremum of the target image frame according to the first gray scale range.

Further, the second acquisition module includes: a first gamma voltage determination module configured to determine a first gamma voltage corresponding to the first gray scale extremum according to the first gray scale extremum; a first gamma reference voltage determination module configured to determine a gamma reference voltage according to the first gamma voltage; and a first adjustment module configured to adjust the first power voltage according to the gamma reference voltage, to obtain the second power voltage.

Further, the display further includes: a third acquisition module configured to transform a plurality of first gray scales of the target image frame, to obtain a second gray scale extremum of the target image frame.

Further, the third acquisition module includes: a second gray scale acquisition module configured to transform the plurality of first gray scales of the target image frame, to obtain a plurality of transformed second gray scales; and a fourth acquisition module configured to obtain a second gray scale extremum of the target image frame according to the plurality of transformed second gray scales.

Further, the second acquisition module includes a second adjustment module configured to adjust the first power voltage according to the first gray scale extremum and the second gray scale extremum, to obtain the second power voltage.

Further, the second adjustment module includes: a second gamma voltage determination module configured to determine a first gamma voltage corresponding to the first gray scale extremum according to the first gray scale extremum, and determine a second gamma voltage corresponding to the second gray scale extremum according to the second gray scale extremum; a second gamma reference voltage determination module configured to determine a gamma reference voltage according to the second gamma voltage; and a third adjustment module configured to adjust the preset first power voltage according to the gamma reference voltage and the first gamma voltage, to obtain the second power voltage.

Further, the display further includes a driving power adjustment module configured to adjust a driving power of the display panel according to the second power voltage.

Further, the first gray scale extremum is a maximum value of the plurality of first gray scales of the target image frame, and the second gray scale extremum is a maximum value of the plurality of second gray scales of the target image frame.

Further, the target image frame of a display panel includes a plurality of pixel points, wherein at least one of the pixel points is preset with a gray scale corresponding to the pixel point.

Figure 5:
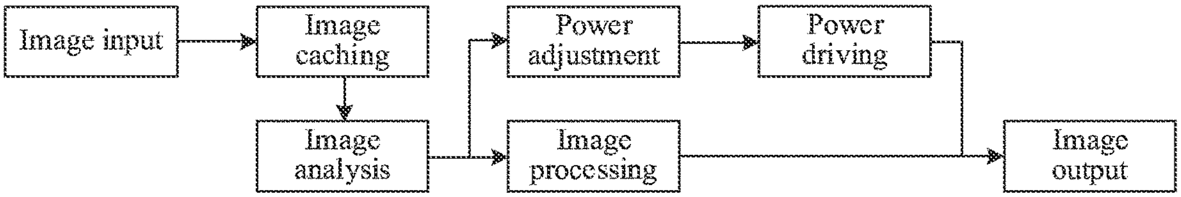
FIG. 5 is a schematic diagram of a structure of a display according to an embodiment of the present disclosure.

FIG. 5 is a schematic diagram of a structure of a display according to an embodiment of the present disclosure.

As shown in FIG. 5, image caching may be performed on the inputted image. The image caching can be implemented using a register. The image caching can read prestored display data of the target frame and cache the display data. When the image caching receives an instruction to start image processing issued by the system, the image cache may transmit the cached display data of the target frame for image analysis.

Further, the display data of the target frame transmitted from the image cache may be received by image analysis, and the display data of the target frame can be analyzed. Due to the non-linear relationship between the visual perception of the image and the brightness, the visual perception can be represented by brightness values at which observation can be performed by human eyes, and the brightness can be represented by a brightness factor. Therefore, based on the nonlinear relationship between the visual perception of the image and the brightness, statistical analysis can be performed on the pixel points of the target image frame, to obtain a range of the brightness values of the target image frame. Certainly, statistical analysis may also be performed on the gray scales of the target image frame, to obtain a range of the gray scales.

Further, the gray scales of the target image frame can be segmented based on the non-linear relationship between the visual perception of the image and the brightness, and the first gray scale is transformed using the segmented function, to obtain the transformed second gray scale.

Further, the power voltage can be adjusted based on the results of the image analysis, the adjusted power voltage is transmitted to the voltage driver, and the final image output is controlled together with the data after the image processing.

Based on the above, according to the embodiments of the present disclosure, the first gray scale extremum of the target image frame is obtained according to the display data of the target image frame. Then the first power voltage is adjusted according to the first gray scale extremum and the second gray scale extremum, to obtain the second power voltage. Finally, the display is driven, according to the second power voltage and the display data of the target image frame, for displaying. In this way, the second power voltage can be dynamically and adaptively adjusted, thereby further reducing the energy consumption of the display panel while ensuring the display effect of the display panel.

In the foregoing embodiments, the description of each embodiment focuses on a different part, and for parts that are not described in detail in one embodiment, reference may be made to the related description of other embodiments.

The driving method for a display and a display provided in the embodiment of the present disclosure are described in detail above. The principles and implementations of the present disclosure are described by using specific examples in this specification, and the descriptions of the embodiments are only intended to help understand the technical solutions and core ideas of the present disclosure. A person of ordinary skill in the art may understand that modifications may still be made to the technical solutions described in the foregoing embodiments, or equivalent replacements may be made to some technical features; and these modifications or replacements will not cause the essence of corresponding technical solutions to depart from the scope of the technical solutions in the embodiments of the present disclosure.

What is claimed is:

1. A driving method for a display, wherein the driving method for a display comprises following steps:

obtaining a plurality of first gray scales of a target image frame according to display data of the target image frame;

obtaining a first gray scale extremum of the target image frame according to the plurality of first gray scales;

transforming the plurality of first gray scales of the target image frame to obtain a plurality of transformed second gray scales;

obtaining a second gray scale extremum of the target image frame according to the plurality of transformed second gray scales;

adjusting a first power voltage according to the first gray scale extremum and the second gray scale extremum, to obtain a second power voltage, wherein the first power voltage is used for driving the display for displaying; and driving, according to the second power voltage and the display data of the target image frame, the display for displaying.

2. The driving method for a display as claimed in claim 1, wherein the step of adjusting the first power voltage according to the first gray scale extremum and the second gray scale extremum, to obtain the second power voltage comprises following steps:

determining a first gamma voltage corresponding to the first gray scale extremum according to the first gray scale extremum, and determining a second gamma voltage corresponding to the second gray scale extremum according to the second gray scale extremum;

determining a gamma reference voltage according to the second gamma voltage; and adjusting the preset first power voltage according to the gamma reference voltage and the first gamma voltage, to obtain the second power voltage.

3. The driving method for a display as claimed in claim 1, further comprising a following step:

adjusting a driving power of a display panel according to the second power voltage.

4. The driving method for a display as claimed in claim 1, wherein the first gray scale extremum is a maximum value of the plurality of first gray scales of the target image frame, and the second gray scale extremum is a maximum value of the plurality of second gray scales of the target image frame.

5. The driving method for a display as claimed in claim 1, wherein the target image frame of a display panel comprises a plurality of pixel points, wherein a gray scale corresponding to at least one of the pixel points is preset for the pixel point.

6. A display, comprising:

a first acquisition module electrically connected to a second acquisition module and configured to obtain obtain a plurality of first gray scales of a target image frame according to display data of the target image frame and obtain a first gray scale extremum of the target image frame according to the plurality of first gray scales;

a second acquisition module configured to transform the plurality of first gray scales of the target image frame to obtain a plurality of transformed second gray scales, and obtain a second gray scale extremum of the target image frame according to the plurality of transformed second gray scales;

the third acquisition module electrically connected to the first acquisition module and a display module and configured to adjust a first power voltage according to the first gray scale extremum and the second gray scale extremum, to obtain a second power voltage, wherein the first power voltage is used for driving the display for displaying; and the display module electrically connected to the third acquisition module and configured to drive, according to the second power voltage and the display data of the target image frame, the display for displaying.

7. The display as claimed in claim 6, wherein the third acquisition module comprises:

a second gamma voltage determination module configured to determine a first gamma voltage corresponding to the first gray scale extremum according to the first gray scale extremum, and determine a second gamma voltage corresponding to the second gray scale extremum according to the second gray scale extremum;

a second gamma reference voltage determination module configured to determine a gamma reference voltage according to the second gamma voltage; and a third adjustment module configured to adjust the preset first power voltage according to the gamma reference voltage and the first gamma voltage, to obtain the second power voltage.

8. The display as claimed in claim 6, further comprising: a driving power adjustment module configured to adjust a driving power of a display panel according to the second power voltage.

9. The display as claimed in claim 6, wherein the first gray scale extremum is a maximum value of the plurality of first gray scales of the target image frame, and the second gray scale extremum is a maximum value of the plurality of second gray scales of the target image frame.

10. The display as claimed in claim 6, wherein the target image frame of a display panel comprises a plurality of pixel points, wherein at least one of the pixel points is preset with a gray scale corresponding to the pixel point.

11. The driving method for a display as claimed in claim 1, wherein the step of transforming the plurality of first gray scales of the target image frame to obtain the plurality of transformed second gray scales comprises:

dividing the plurality of first gray scales of the target image frame into a plurality of groups; and transforming the plurality of first gray scales of the target image frame according to the plurality of groups and a preset transformation coefficient, to obtain the plurality of transformed second gray scales.

12. The display as claimed in claim 6, wherein the second acquisition module is further configured to:

divide the plurality of first gray scales of the target image frame into a plurality of groups; and transform the plurality of first gray scales of the target image frame according to the plurality of groups and a preset transformation coefficient, to obtain the plurality of transformed second gray scales.

* * * * *